United States Patent [19]
Sandberg

[11] Patent Number: 5,907,575
[45] Date of Patent: May 25, 1999

[54] APPARATUS AND METHOD FOR MINIMIZING PERFORMANCE DEGRADATION IN A LASER DEVICE

[75] Inventor: Jon C. Sandberg, Boulder, Colo.

[73] Assignee: Research Electro-Optics, Inc., Boulder, Colo.

[21] Appl. No.: 08/895,965

[22] Filed: Jul. 17, 1997

[51] Int. Cl.[6] ........................................................ H01S 3/08
[52] U.S. Cl. ........................................ 372/98; 372/101
[58] Field of Search .................................... 372/92, 98, 99, 372/101

[56] References Cited

U.S. PATENT DOCUMENTS 3,696,310 10/1972 Paoli et al. .................... 372/101 X
5,012,483 4/1991 Reintjes et al. ................. 372/101 X

*Primary Examiner*—John D. Lee
*Attorney, Agent, or Firm*—Robert E. Harris

[57] ABSTRACT

Apparatus and method are disclosed for minimizing performance degradation in a laser device having a laser cavity operating in a predetermined spatial mode having predetermined light beam wavefronts within the laser cavity mode. An optically transmissive unit is placed within the laser cavity and has at least one intracavity optical surface that may be positioned at or provides one end of a laser medium that is within the laser cavity with the intracavity optical surface being coincident with the laser mode wavefronts in order to minimize power losses in the laser device due to contamination buildup at the intracavity optical surface. The optic unit may also include a second optical surface that is less exposed to contamination and has a configuration suitable for providing needed focal properties for the optic unit, and one or more of the optical surfaces may have a reflection coating thereon. Contamination buildup on the optical surfaces causes a change in reflectance with an increase in reflectance resulting in power losses in the laser cavity. The effect of increased reflectance is minimized by curvature and/or orientation selection of the intracavity optical surface such that the light reflected from the surface is maintained within the laser cavity as occurs when the surface is coincident with the light beam wavefronts.

27 Claims, 2 Drawing Sheets

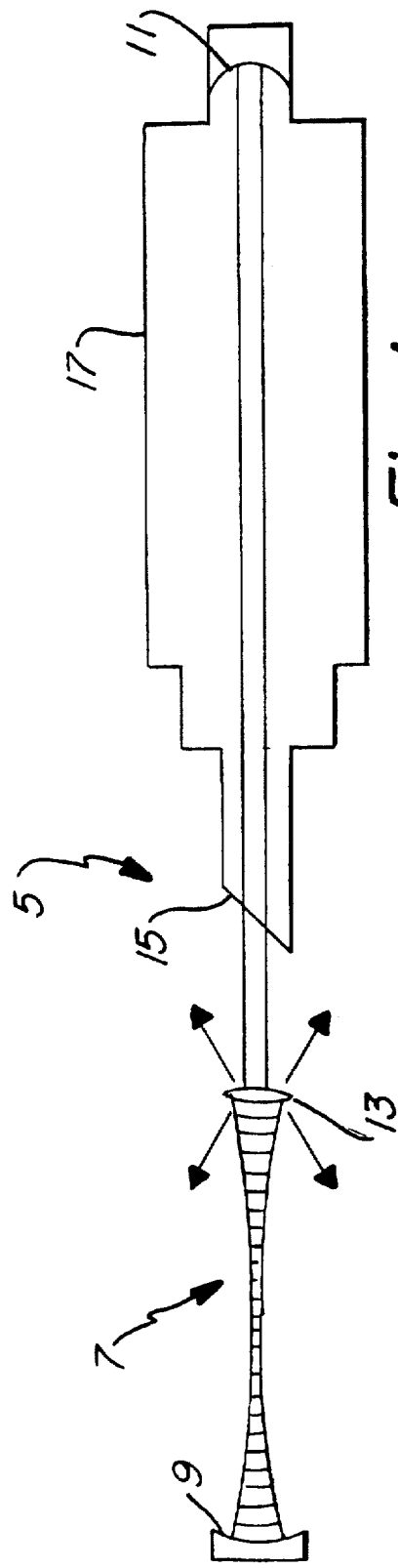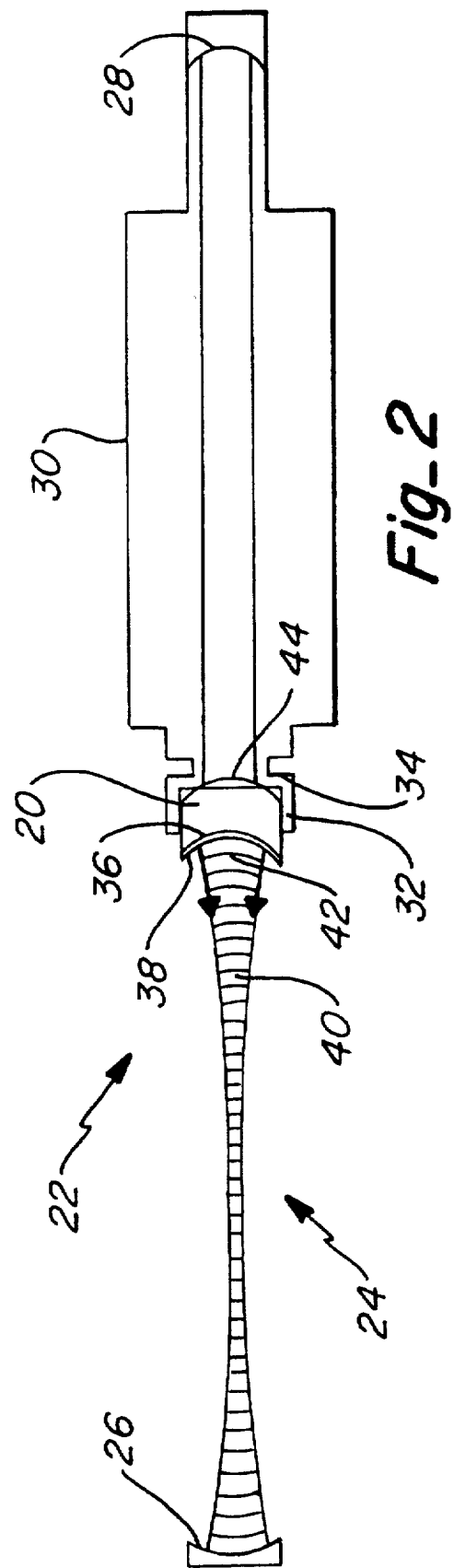

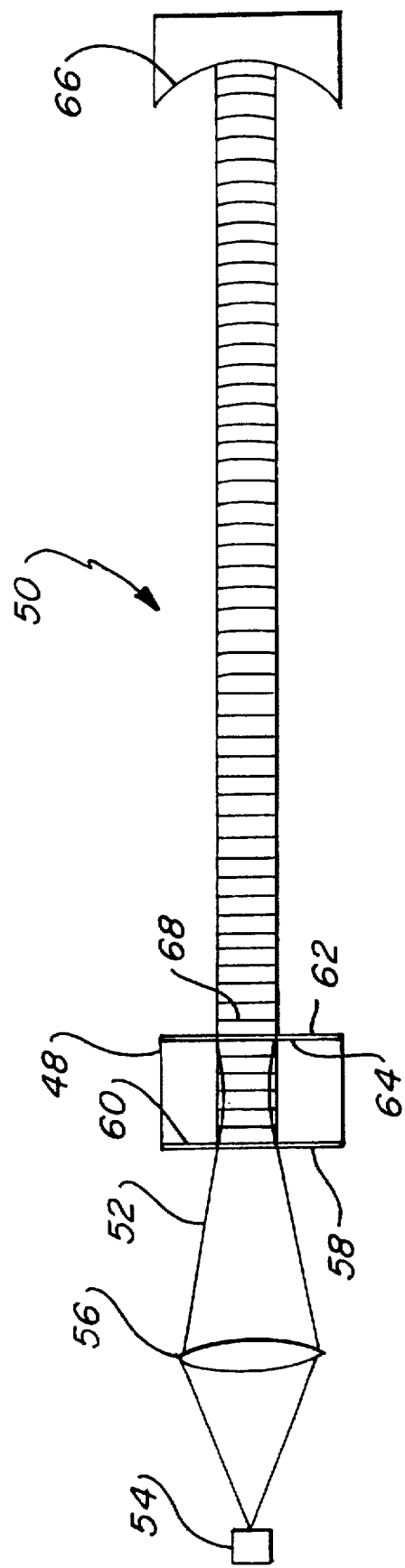
Fig_3

APPARATUS AND METHOD FOR MINIMIZING PERFORMANCE DEGRADATION IN A LASER DEVICE

FIELD OF THE INVENTION

This invention relates generally to a laser device, and, more particularly, relates to apparatus and method for minimizing performance degradation in a laser device.

BACKGROUND OF THE INVENTION

Laser devices are now well known, and it is likewise well known that laser devices can provide relatively high power outputs. In addition, it is known that transmissive optics can be utilized intracavity in a laser device, and such use is shown, by way of example, in FIG. 1, illustrating, typically, a laser 5 having a laser cavity 7 extending between mirrors 9 and 11 with lens 13 positioned in the laser cavity between mirror 9 and Brewster window 15 of a laser medium 17 (shown in FIG. 1 as a gas laser medium within the laser cavity).

Power degradation in laser devices due to contamination buildup on intracavity optical surfaces has, however, been a serious problem in many applications, and often dictates the service interval for current commercial instrumentation that is based on low-loss laser devices.

It has been observed that mirror surfaces, for example, show lower apparent degradation rates than anti-reflection coated surfaces of transmissive optics, even when in similar environments. This observation is consistent with the contamination that consists of substantially non-absorbing (or dielectric) Material that condenses to form relatively uniform films oil intracavity surfaces.

A dielectric film deposited on a mirror surface will typically degrade its nominally high reflectance only a small amount, while a dielectric film deposited on an anti-reflection coated surface, or on a Brewster surface, normally raises its nominally low reflectance, and at least in some cases, does so quite dramaticaly.

Currently, increased reflectance on the surfaces of transmissive optics has been ignored, or at least inadequately handled, in laser based devices, and this has caused degradation of the performance of such devices. In particular, the curvature and orientation of surfaces of transmissive optics are now commonly chosen without regard to how light reflected from the surface propagates with respect to the cavity mode, and hence the light reflected from the surface is lost from the laser cavity, resulting in power losses.

SUMMARY OF THE INVENTION

This invention provides apparatus and method for minimizing power degradation in a laser device, and, particularly, in a laser device having a laser cavity operating in a predetermined spatial mode having predetermined light beam wavefronts within the laser cavity mode.

An optically transmissive unit placed within the laser cavity has at least one intracavity optical surface that may be positioned at or provides one end of a laser medium that is within the laser cavity with the intracavity optical surface being substantially coincident with the light beam, or laser mode, wavefronts within the laser cavity to minimize power losses in the laser cavity due to contamination buildup at the intracavity optical surface.

The transmissive optic unit may also include a second optical surface positioned to be less exposed to contamination buildup, with the second optical unit having a configuration suitable for providing needed focal properties for the optic unit.

One or more of the optical surfaces of the transmissive optic unit can, and normally has, a reflection coating thereon, such as an anti-reflection (i.e., highly transmissive) coating or a high reflection (i.e., substantially non-transmissive) coating.

Contamination buildup on the optical surface, including on the reflection coating on the optical surface where utilized, causes a change in reflectance at the optical surface, with an increase in reflectance resulting in power losses in the laser cavity.

The effect of increased reflectance is minimized by the curvature and/or orientation of the intracavity optical surface such that light reflected from the intracavity optical surface is maintained within the laser cavity as occurs when the surface is substantially coincident with the light beam wavefronts.

It is therefore an object of this invention to provide apparatus and method for minimizing performance degradation in a laser device.

It is another object of this invention to provide apparatus and method for providing an optic unit to minimize the effect of contamination buildup on a surface of the optic unit within a laser cavity mode.

It is another object of this invention to provide apparatus and method for minimizing performance degradation in a laser device wherein an intracavity optical surface is positioned at or provides one end of a laser medium within a laser cavity.

It is another object of this invention to provide apparatus and method for minimizing performance degradation in a laser device wherein an intracavity optical surface is caused to be substantially coincident with the light beam wavefronts within the laser cavity mode.

It is another object of this invention to provide apparatus and method for minimizing performance degradation in a laser device wherein an intracavity optical surface causes light reflected from the surface to be maintained within the laser cavity mode.

It is still another object of this invention to provide apparatus and method for minimizing performance degradation in a laser device wherein an intracavity optical surface having a reflection coating thereon has a curvature and orientation to maintain light reflected from the surface within the laser cavity mode to thereby minimize the effect of increased reflectance due to contamination buildup.

It is still another object of this invention to provide apparatus and method for minimizing performance degradation in a laser device having an optic unit with an intracavity optical surface configured for minimizing the effect of contamination buildup on the surface and a second optical surface positioned to be less exposed to contamination buildup and configured for proving necessary focal properties for the optic unit.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a simplified side view showing a typical prior art laser device having an optic unit within the laser cavity;

FIG. 2 is a side view illustrating apparatus according to this invention wherein the optically transmissive unit is an optic unit that includes an intracavity optical surface positioned at one end of a gas laser medium; and FIG. 3 is a side view illustrating apparatus according to this invention wherein the optically transmissive unit includes optical surfaces that provide opposite ends of a solid state laser medium.

DESCRIPTION OF THE INVENTION

In this invention, optically transmissive unit 20 of laser 22 may be positioned within laser cavity 24, as is shown in FIG. 2, to minimize performance degradation of laser 22. As specifically indicated, laser 22 includes mirrors 26 and 28 and a gas laser medium 30 within laser cavity 24.

As also shown in FIG. 2, optically transmissive unit 20 is an optic unit preferably positioned at one end of gas laser medium 30 with the optic unit being preferably mounted at the end of the laser medium using mount 32 shaped such that there is an annular indention 34 between the body of the laser medium and mount 32 so that mount 32 can be angularly moved, or displaced, relative to the body of laser medium 30 in order to align, or orient, the optic unit.

Displacement of mount 32 relative to the body of laser medium 30 can be accomplished, for example, by forcing mount 32 away from the body of laser medium 30 at a selected point along indention 34. This is commonly accomplished by a screwdriver, or the like, inserted in annular indention 34 to wedge the mount away from the body of the laser medium and thereby provide a slight angular displacement of the mount relative to the body of the laser medium to thereby align, or orient, the optic unit.

Optic unit 20 includes an intracavity optical surface 36 positioned, as shown in FIG. 2, to be subject to contamination buildup, with surface 36 having a specific curvature and orientation for effecting performance degradation minimization, and, particularly, for minimizing the effect of increased reflectance on the surface (surface 36 may, but not necessarily, have thereon an anti-reflection coating 38, i.e., a coating that is highly transmissive, up to ninety percent or better, at the wavelength utilized).

By controlling the curvature and orientation of the surfaces of optics, such as transmissive optics, light reflected from the surface can be reflected in such a manner that the reflected light does not leave laser cavity mode 40, as is indicated in FIG. 2, and the reflectance of the surface is not a direct loss mechanism (as is the case with respect to now known laser devices as is indicated in FIG. 1).

In order to eliminate surface reflectance as a direct loss mechanism, it is necessary that the light beam reflected from the surface achieves a good overlap with the cavity mode, both in direction of propagation and propagation characteristics (including, particularly, the size of the beam), with best results occurring when the light beam reflected from the surface overlaps precisely with the cavity mode.

These conditions are satisfied if the curvature and orientation of the surface are chosen so that the surface is substantially coincident with the wavefronts 42 of the cavity mode at the location of the surface, as indicated in FIG. 2, with best results again occurring when the surface is precisely coincident with the light beam wavefronts.

The wavefronts of the cavity mode will, of course, have more or less curvature dependent upon the geometrical configurations of the cavity utilized, and, obviously, the optical surface will need to have substantially the same curvature to achieve acceptable coincidence.

As also shown in FIG. 2, optic unit 20 can include a second optical surface 44, and this surface may also (but not necessarily) have a reflection coating thereon like that of coating 38 on surface 36. Surface 44 is preferably positioned to be less susceptible to contamination buildup than is intracavity optical surface 36, and hence can be utilized to provide needed focal properties for the optic unit.

It is normally a straightforward matter to calculate the properties of the wavefronts of a cavity mode at a location within the laser cavity and hence determine the ideal curvature and orientation of all intracavity surfaces with respect to contamination resistance. However, it is not possible to choose the curvature of both surfaces of an intracavity optic unit arbitrarily without modifying the focal properties of the optic unit and preventing the optic unit from performing its intended function.

By positioning the transmissive optic unit within the laser cavity with one surface in a position relatively more susceptible to contamination buildup (i.e., intracavity optical surface 36, as indicated in FIG. 2) to thus expose this surface to the significant contamination sources, and positioning the other surface (i.e., second optical surface 44, as indicated in FIG. 2)) so that this surface is less exposed to significant contamination sources, significant minimizing of performance degradation is achieved while allowing the optic unit to still fulfill its intended function of providing the necessary focal properties as needed.

Thus, intracavity optical surface 36, chosen to be coincident with the cavity mode wavefronts to thereby minimize the performance degradation associated with the contamination, has a concave curvature, as shown in FIG. 2, while second optical surface 44, chosen to give the optic unit the desired overall focal properties to permit the optic unit to perform its intended function, may have, by way of example, a convex curvature, as shown in FIG. 2.

In addition to proper choice of curvature for an intracavity optical surface as shown in FIG. 2, it is also necessary to carefully control alignment of optic unit 20 (and hence to carefully control alignment, or orientation, of the intracavity optical surface), for much the same reasons as it is necessary to control the alignment of the mirrors of a laser-based device. Therefore, it is preferable that mount 32 be slightly displaceable with respect to laser cavity 24 to provide fine adjustment, to control the orientation of the optic unit, and, particularly, the intracavity optical surface of the optic unit.

As shown in FIG. 3, performance degradation minimization may also be realized in conjunction with a solid state laser medium in the laser cavity in lieu of a gas laser medium as shown in FIG. 2. As indicated, solid state laser medium 48 (such as, for example a Nd:YAG crystal) is positioned within laser cavity 50, and may be positioned at one end of the laser cavity so that solid state laser medium 48 may be optically pumped (end-pumped as indicated in FIG. 3) by pump bear 52 from a pump source 54 (such as a semiconductor laser) through lens 56, as is now well known for pumping solid state lasers.

Solid state laser medium 48 has a high reflection coating 58 (i.e., high reflectance (approaching total reflectance) at the utilized transverse mode of the laser cavity but highly transmissive (ninety percent or better) at the pump wavelength) on end, or side, 60 of the solid state laser medium receiving the pump beam from the pump source, solid state laser medium 48 also has an anti-reflection coating 62 (i.e., highly transmissive at the utilized wavelength of the laser cavity) on end, or side, 64 opposite to that of end 60 with laser cavity 50 being formed between end 60 (with coating 58 thereon) and mirror 66 (positioned outwardly from end 64).

By forming coated ends 60 and 64 of solid state laser medium 48 with a high degree of parallelism (which is contrary to normal practice in laser design), the coated surfaces are substantially coincident with substantially planar wavefronts 68 of the cavity mode, as is indicated in FIG. 3, to thus minimize performance degradation in the laser device in the same manner as brought out above with respect to the curved surfaces of the intracavity optical surface illustrated in FIG. 2. As brought out in connection with the intracavity optical surface illustrated in FIG. 2, best results occur when the surfaces are precisely coincident with the wavefronts of the cavity mode.

As can be appreciated from the foregoing, this invention provides apparatus and method for minimizing the effect of contamination buildup on intracavity optical surfaces to thereby minimize performance degradation in a laser device.

What is claimed is:

1. Apparatus for minimizing performance degradation in a laser device, said apparatus comprising:

a laser cavity within the laser device, said laser cavity operating in a predetermined mode having predetermined light beam wavefronts within said predetermined mode; and an optically transmissive unit within said laser cavity, said optically transmissive unit including an intracavity optical surface that is substantially coincident with said light beam wavefronts within said predetermined mode to thereby minimize power losses in the laser device due to contamination buildup at said intracavity optical surface.

2. The apparatus of claim 1 wherein the laser device includes a laser medium within said laser cavity, and wherein said optically transmissive unit is at one end of said laser medium.

3. The apparatus of claim 1 wherein said contamination buildup on said intracavity optical surface causes an increase in reflectance, and wherein said intracavity optical surface minimizes said power losses in said laser cavity by minimizing the effect of said increased reflectance due to said contamination buildup.

4. The apparatus of claim 3 wherein said intracavity optical surface has a reflection coating thereon, and wherein said contamination buildup on said reflection coating causes said increase in reflectance.

5. The apparatus of claim 1 wherein said intracavity optical surface has a curvature and orientation such that light reflected from said surface is maintained within said predetermined mode.

6. The apparatus of claim 5 wherein said apparatus includes an adjustable mount for controlling said orientation of said intracavity optical surface.

7. The apparatus of claim 1 wherein said laser device includes a laser medium, and wherein said intracavity optical surface of said optically transmissive unit is positioned at an end of said laser medium.

8. The apparatus of claim 7 wherein said optically transmissive unit includes a second optical surface providing overall focal properties needed by said optically transmissive unit with said second optical surface being positioned to be less susceptible to contamination buildup than is said intracavity optical surface.

9. The apparatus of claim 8 wherein said intracavity optical surface is a concave surface, and wherein said second optical surface is a convex surface.

10. The apparatus of claim 1 wherein said laser device includes a solid state laser medium having substantially planar and parallel first and second end surfaces with reflection coatings on at least said first end surface with said first end surface being said intracavity optical surface.

11. The apparatus of claim 10 wherein said first substantially planar surface has a high reflection coating thereon and said second substantially planar surface has an anti-reflection coating thereon.

12. Apparatus for minimizing performance degradation in a laser device, said apparatus comprising:

a laser cavity within the laser device, said laser cavity operating in a predetermined mode having predetermined light beam wavefronts within said predetermined mode;

an optically transmissive unit within said laser cavity, said optically transmissive unit including an intracavity optical surface having a curvature that is substantially coincident with said light bean wavefronts within said predetermined mode, and a second optical surface having a configuration suitable for providing focal properties for said optically transmissive unit; and a mount for said optically transmissive unit for orienting said optically transmissive unit with respect to said laser cavity so that said intracavity optical surface is aligned with said light beam wavefronts within said predetermined mode in said laser cavity.

13. The apparatus of claim 12 wherein the laser device includes a laser medium within said laser cavity, and wherein said optically transmissive unit is positioned by said mount at one end of said laser medium.

14. The apparatus of claim 12 wherein said intracavity optical surface causes light reflected from said surface to overlap with the cavity mode, both in direction of propagation and propagation characteristics.

15. The apparatus of claim 12 wherein said intracavity optical surface is subject to contamination buildup thereon that causes an increase in reflectance resulting in power losses in said laser cavity, and wherein said intracavity optical surface minimizes said power losses in said laser cavity by minimizing the effect of said increased reflectance due to said contamination buildup.

16. The apparatus of claim 15 wherein said intracavity optical surface has a reflection coating thereon, and wherein said contamination buildup at said intracavity optical surface occurs on said reflection coating to cause said increase in reflectance.

17. The apparatus of claim 12 wherein said intracavity optical surface is a concave surface, and wherein said second optical surface is a convex surface.

18. A method for minimizing performance degradation in a laser device, said method comprising:

providing a laser cavity within the laser device with the laser cavity operating in a predetermined mode having predetermined light beam wavefronts within the predetermined mode; and providing an optically transmissive unit at said laser cavity with the optically transmissive unit including an intracavity optical surface that is substantially coincident with the light beam wavefronts within the predetermined mode of the laser cavity to thereby minimize power losses in the laser device due to contamination buildup on the intracavity optical surface.

19. The method of claim 18 wherein said method includes causing light reflected from the intracavity optical surface to overlap precisely with the predetermined mode of the laser cavity, both in direction of propagation and propagation characteristics.

20. The method of claim 18 wherein the intracavity optical surface is subject to contamination buildup thereon that causes an increase in reflectance, and wherein the intracavity optical surface minimizes the power losses in the laser cavity by minimizing the effect of the increase in reflectance due to contamination buildup on the intracavity optical surface.

21. The method of claim 20 wherein said method includes depositing a reflection coating on the intracavity optical surface, and wherein the contamination buildup occurs on the reflection coating causing the increase in reflectance.

22. The method of claim 18 wherein said method includes providing a laser medium within the laser cavity, and positioning the optically transmissive unit at an end of the laser medium.

23. The method of claim 22 wherein said method includes providing at least one of a curvature on the intracavity optical surface and an orientation of the optically transmissive unit such that light reflected from the intracavity optical surface is maintained within the predetermined mode of the laser cavity.

24. The method of claim 23 wherein said method includes adjusting the orientation of the optically transmissive unit to achieve good alignment of the intracavity optical surface with the light beam wavefronts.

25. The method of claim 22 wherein said method includes providing a second optical surface that is positioned to be less exposed to contamination buildup and has a configuration suitable to provide the needed optical properties for the optically transmissive unit.

26. The method of claim 18 wherein said method includes providing a solid state laser medium within the laser cavity, providing substantially planar and parallel first and second end surfaces on the solid state laser medium, and coating at least one of said end surfaces with a reflection coating such that said reflection coating provides the intracavity optical surface of the optically transmissive unit.

27. The method of claim 26 wherein said end surface having said reflection coating thereon is coated with a high reflection coating, and wherein the other of said end surfaces is coated with an anti-reflection coating.

* * * * *